United States Patent [19]

Wingler et al.

[11] 4,181,788

[45] Jan. 1, 1980

[54] PROCESS FOR THE PRODUCTION OF THERMOPLASTIC MOLDING MATERIALS BASED ON VINYL POLYMERS

[75] Inventors: Frank Wingler; Lothar Liebig; Gerd Wassmuth; Martin Ullrich; Manfred Hederich, all of Leverkusen, Fed. Rep. of Germany

[73] Assignee: Bayer Aktiengesellschaft, Fed. Rep. of Germany

[21] Appl. No.: 908,763

[22] Filed: May 23, 1978

[30] Foreign Application Priority Data

May 28, 1977 [DE] Fed. Rep. of Germany ....... 2724360

[51] Int. Cl.$^2$ ................................................ C08F 6/10
[52] U.S. Cl. .......................................... 526/68; 526/71; 528/481; 528/501
[58] Field of Search .................... 526/68, 71; 528/480, 528/481, 501, 502

[56] References Cited

U.S. PATENT DOCUMENTS

| | | | |
|---|---|---|---|
| 2,745,824 | 5/1956 | Melchore | 526/68 |
| 2,769,804 | 11/1956 | Hanson | 526/65 |
| 2,931,793 | 4/1960 | Melchore | 526/65 |
| 3,207,205 | 9/1965 | Briskin | 528/502 |
| 4,015,064 | 3/1977 | Feldman | 528/501 |
| 4,086,411 | 4/1978 | Nagano | 528/480 |
| 4,094,942 | 6/1978 | Nakai | 526/71 |
| 4,107,421 | 8/1978 | Scamehorn | 528/480 |

Primary Examiner—Paul R. Michl
Attorney, Agent, or Firm—Connolly and Hutz

[57] ABSTRACT

A process for the production of thermoplastically processible moulding materials based on vinyl polymers of high chemical and molecular uniformity and having residual monomer contents of less than 0.1 mol % which comprises the steps of:

(i) mass homogeneous phase polymerization of at least one vinyl monomer in a stirred continuously charged tank reactor to a conversion of from 25 to 60 mol %;

(ii) directly concentrating the syrup consisting of residual monomers and vinyl polymer dissolved therein obtained from step (i) in a spiral tube evaporator at a temperature of from 60° to 250° C. and at a pressure of 100 m bar to 35 bar to obtain a solid content of vinyl polymer of from 40 to 90 mol %;

(iii) directly charging the concentrate obtained from step (ii) to the inlet zone of a screw evaporator which consists of at least two sequential zones in order to effect further concentration, in which a first zone at a pressure of from 10 to 300 m bar and at a temperature of from 100° to 250° C. concentrates the vinyl polymer to a solid content of from 80 to 99 mol-%, and each subsequent zone at a pressure of 1 to 200 m bar and at a temperature of 150° to 250° C. concentrates the vinyl polymer to a solid content of at least 99.9 %; and (iv) recycling the residual monomers from step (ii) and the residual monomers from said first zone of the screw evaporator to the stirred and charged tank reactor without intermediate cleaning.

3 Claims, 1 Drawing Figure

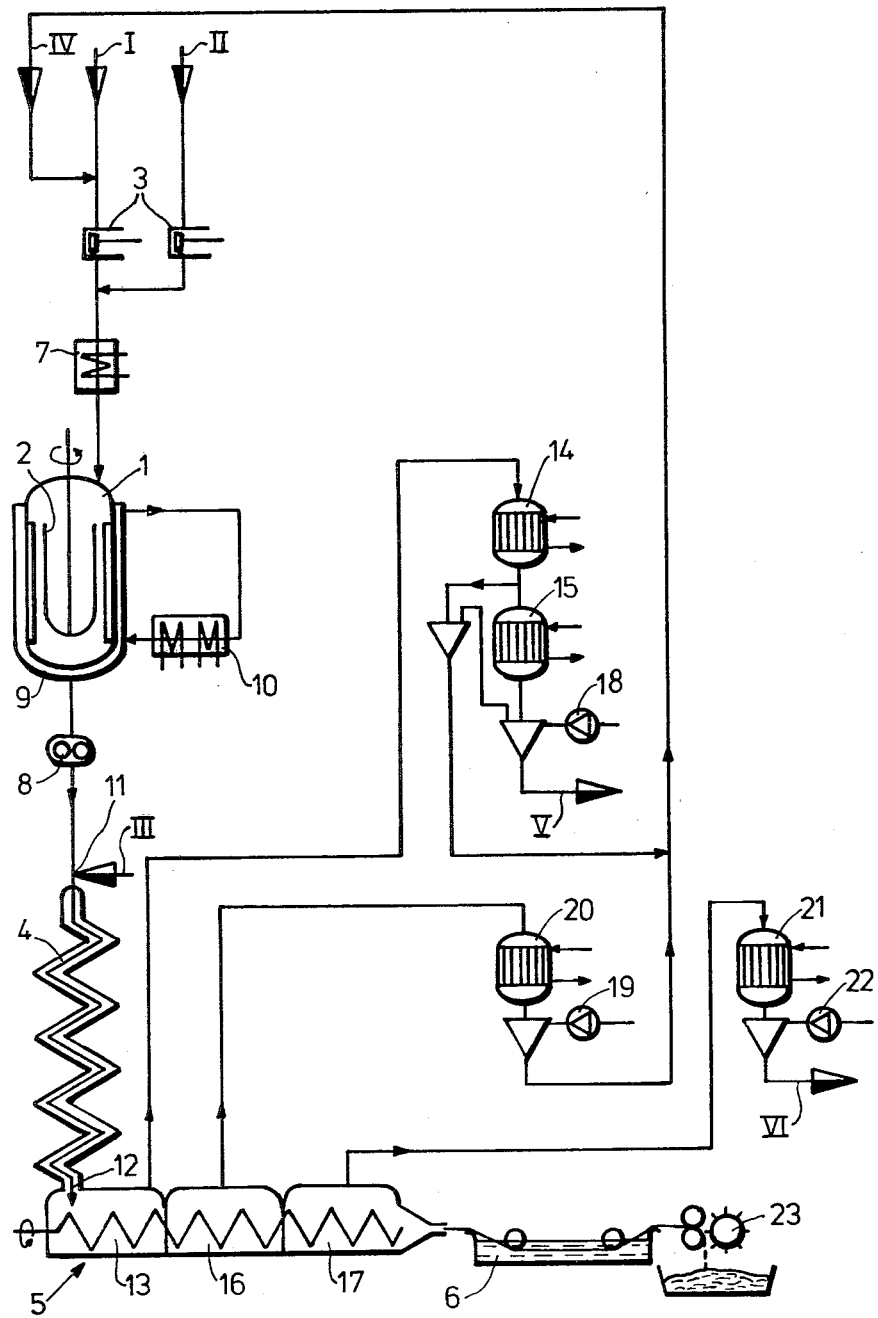

PROCESS FOR THE PRODUCTION OF THERMOPLASTIC MOLDING MATERIALS BASED ON VINYL POLYMERS

The present invention relates to a multi-stage process for the production of thermoplastically processible moulding materials based on vinyl homopolymers and vinyl copolymers, having high chemical and molecular uniformity, by continuous mass polymerisation in a stirred and continuously charged tank reactor and for subsequent working up in a special combination of a spiral tube evaporator and a screw evaporator as well as by fractional recovery of residual monomers and recycling of certain fractions into the polymerisation process.

Multiple stage processes for mass polymerisation of vinyl compounds, in particular of vinyl aromatic compounds as well as the copolymers thereof with alkyl acrylates, alkyl methacrylates acrylonitrile, methacrylonitrile and maleic acid anhydride are known.

Polymerisation generally takes place in a thoroughly mixed, continuously charged tank reactor and subsequently in a high viscosity reactor up to a solid content in excess of 60% by weight. Unreacted monomers are recovered in evaporators and recycled to the polymerisation process. Thermoplastic moulding materials are highly viscous in the melts so that the final evaporation to solid values in excess of 98% by weight is usually nowadays carried out in screw evaporators. The increasing awareness for the needs of protection of the environment and of the consumers demands requires that smaller and smaller residual contents of monomers be present in thermoplastically deformable polymers so that new processes have to be found for meeting said needs in an economical manner.

A process is known under the name of "Stober Amos Process" (cf. Polymer Engineering Science, January 1974, Vol. 14, No. 1 and U.S. Pat. No. 2,530,409) in which polymerisation is carried out in three stages. In the first stage, polymerisation of the monomer is initiated in a tank reactor with stirring. In the second stage, the monomer is further reacted in a screw polymerization machine and in the third stage the polymer is freed of its monomers in an evaporator. The quantitative flow rate for the process is provided by the dosing of monomers, and the prepolymeriser is driven at slight superpressure. Methods of removing monomers are described, for example, in U.S. Pat. No. 2,849,430. Using these methods, the monomers are driven off in an unstirred tank at temperatures above 200° C. and the product is delivered via a screw.

The combined polymerisation of vinyl monomers and the removal of monomers by evaporation on a single screw machine is described in British Pat. No. 975,853.

Another process for the production of thermoplastically processible resins having a polymer content of more than 98% by polymerisation in masses in a stirred tank reactor and subsequent removal of the residual monomers on a screw evaporator is described in U.S. Pat. No. 2,745,824. The monomers recovered from the screw evaporator are condensed in a common cooler and are then recycled directly back into the mass polymerisation process.

A process is described in U.S. Pat. No. 2,931,793 which consists of a combination of a stirred tank reactor, a screw polymerisation machine and a screw evaporator machine. The condensed monomers from the evaporation stage are also in this case, recycled back into the polymerisation process. The following reaction and temperature conditions are maintained with this mode of operation:

1. Tank reactor polymerisation stage:
   85° to 120° C., 20 to 45% conversion,
2. Screw polymerisation stage:
   Reaction not more than 70%,
3. Concentration on the screw evaporator stage:
   110° to 225° C.,
   Solid=98% by weight.

The monomers are introduced under pressure in stage 1.

The screw polymerisation machine in stage 2 is traversed by polymer syrup from stage 1 with the aid of a pump by pressure or by a shearing force.

The product is extruded from the evaporation screw machine in a strand.

Another patent relates to continuous mass polymerisation in a stirred tank reactor wherein the monomers are removed on an evaporator and are then recycled into the mass polymerisation process (U.S. Pat. No. 2,769,804). In this patent, the recovered monomers are similarly recycled directly into the process without fractionation. The polymerisation reactor is flooded, and a proportion of the polymer syrup is recycled. Certain copolymers, including those containing maleic acid anhydride may be produced by this "single tank" process.

Screw machines are relatively expensive and complex apparatus whether used as a reaction chamber or as an evaporator. However, their use is unavoidable in many cases for controlling the high viscosities of the melt flow, and in particular when removing monomers from the thermoplastically deformable vinyl polymers. It has been found that the evaporation of polymer solutions having a solid content below 60% by weight is uneconomical on screw evaporators since the relatively expensive apparatus can only be operated with a relatively small throughput based on polymer. This is due to the fact that the heat transfer surfaces are limited, and the heat required for evaporation of relatively large quantities of residual monomers cannot be conveyed to the flow of product in economical periods. The combination of preliminary evaporation treatment and direct charging of the concentrate on to a screw evaporator has therefore been proposed (cf. German Auslegeschrift No. 1,964,946). A condition of the so-called "relief evaporation" (=flash evaporation) as preliminary evaporation is that the polymer syrup may be brought to relatively high temperatures and pressures prior to relief. There arise the dangers, however, of the product being damaged, and of undesirable after-polymerisation occuring which usually leads to products which are not chemically and molecularly uniform.

Although the solid of more than 60% by weight which is economical for screw evaporation may be obtained by subsequent polymerisation in a high viscosity reactor, in particular in a screw reactor, the high viscosity reactor should be avoided for reasons of cost.

Another problem of continuous mass polymerisation is the re-use of the residual monomers. For reasons of viscosity, mass polymerisation treatments are only carried out up to reactions of a maximum of 60 to 80 Mol %. Unreacted monomers have to be recovered, and if they are fed back to the prepolymerisation process, as they are in the processes described, impurities accumulate after prolonged periods of operation and not only hinder the polymerisation process but also impair the quality of the product. The impurities usually originate from non-copolymerising admixtures of the industrial starting monomers and they are also normally formed during the process from initiators, from the additives controlling the molecular weight and from side reactions of the monomers such as disproportionation and Diels-Alder additions. In particular, during the polymerisation of styrene, considerable amounts of foul-smelling impurities are produced after a short period, and these inhibit polymerisation and accumulate in the product. In theory, the recovered monomers may be purified by fractional distillation, but this leads to additional expenses.

The aim of the present invention was to find an economical continuous process for mass polymerisation, avoiding an expensive high viscosity reactor, for the production of vinyl polymers, and in particular vinyl copolymers, which are substantially chemically and molecularly uniform, with recycling of the unreacted monomers, and in which accumulations of impurities which impair polymerisation and the quality of the product are avoided after prolonged periods of operation, and which supplies residual contents of monomers in the product of below 0.1 mol percent.

This aim was achieved in that polymerisation was carried out in a first stage in a continuously charged and ideally stirred tank reactor up to conversions of a maximum of 60 mol % polymer dissolved in the residual monomers concentrating in a second stage in a spiral tube evaporator to a solid content of up to 90 mol-%, and finally evaporating to a solid of at least 99.9 mol % in a third stage in at least two zones of a screw evaporator, recovering 86 to 98.5 mol % of the residual monomers by fractional condensation, which monomers may then be fed to the polymerisation process without an accumulation of undesirable impurities.

The invention therefore provides a process for the production of thermoplastically processible moulding materials based on vinyl polymers of high chemical and molecular uniformity and having residual monomer contents of less than 0.1 mol-% which comprises the steps of:

(i) mass homogeneous phase polymerisation of at least one vinyl monomer in a stirred charged tank reactor to a conversion of from 25 to 60 mo %;

(ii) directly concentrating the syrup consisting of residual monomers and vinyl polymer dissolved therein obtained from step (i) in a spiral tube evaporator at a temperature of from 60° to 250° C. and at a pressure of 100 mbar to 35 bar to obtain a solid content of vinyl polymer of from 40 to 90 mol %;

(iii) directly charging the concentrate obtained from step (ii) to the inlet zone of a screw evaporator which consists of at least two sequential zones in order to effect further concentration in which a first zone at a pressure of from 10 to 300 mbar and at a temperature of from 100° to 250° C. concentrates the vinyl polymer to a solid content of from 80 to 99 mol-%, and each subsequent zone at a pressure of 1 to 200 mbar and at a temperature of 150° to 250° C. concentrates the vinyl polymer to a solid content of at least 99.9%; and (iv) recycling the residual monomers from step (ii) and the residual monomers from said first zone of the screw evaporator to the stirred and charged tank reactor without intermediate cleaning.

In a preferred embodiment of the invention the residual monomers in the spiral tube evaporator are expelled with the aid of a stream of inert gas which is present in an amount of from 10 to 1000 parts by volume to 100 parts by volume of the residual monomers expelled, the inert gas streams charged with said residual monomers being freed thereof in two sequential zones, which zones differ in temperature by at least 10° C., and wherein from 60 to 99.5% by volume of the residual monomers are condensed in the zone at the higher temperature and from 0.5 to 50% by volume of the residual monomers are condensed in the zone of the lower temperature and the condensed monomers from the higher temperature condensation zone being combined with the residual monomers from the first zone of the screw evaporator and recycled to the tank reactor.

The monomers which may be polymerised by the process of the present invention described can be divided into three classes A, B and C. Vinyl aromatic substances belong to the monomers in group A, vinyl compounds containing nitrile groups belong to class B and olefinically unsaturated compounds not falling under A or B which copolymerise with A or B, in particular acryl, methacryl, maleic, fumaric and vinylester monomers belong to group C.

Monomers in Class A include: Styrene and its derivatives such as $\alpha$-methyl, $\alpha$-cyan-, $\alpha$-trifluoro-methyl-, $\alpha$-fluoro, $\beta$-fluoro, $\beta,\beta$-difluoro-, $\alpha,\beta$-difluoro-, $\alpha,\beta,\beta$trichloro-, o-chloro-, p-fluoro-, p-bromo-, m-bromo-, p-iodo-, 2,3-dichloro-, 2,4-dichloro-, 2,3-difluoro-, 2,4-difluoro-, pentachloro-, m-methyl-, 2,5-dimethyl-, p-tert.-butyl-, p-methoxy-, p-cyan, m-nitro, p-nitro- and p-dimethylamino-styrene-,
1-vinylnaphthaline, 2-vinylnaphthaline
2-vinylphenanthrene, 9-vinylphenanthrene
2-vinylpyridine, 3-vinylpyridine, 4-vinylpyridine,
2-vinylpyridine-N-oxide, 4-vinylpyrimidine,
2-vinylthiophene,
n-vinylcarbazol, and
vinylbenzoate.

Styrene and $\alpha$-methyl styrene are preferred.

Group B includes acrylonitrile, methacrylonitrile, $\alpha$-chloroacrylonitrile, $\alpha$-cyanoacrylic acid and its alkyl esters having from 1 to 8 carbon atoms in the alcohol moiety, ethylidene cyanoacetic acid and its alkyl esters having from 1 to 8 carbon atoms in the alcohol moiety, $\alpha$-cyanosorbic acid and its alkyl esters having from 1 to 8 carbon atoms in the alcohol moiety, methylene malonic acid dinitrile, ethylene malonic acid dinitrile, maleic acid dinitrile, and fumaric acid dinitrile. Acrylonitrile and methacrylonitrile are preferred.

Group C includes acrylic acid and methacrylic acid alkyl esters, -cycloalkyl esters, -phenylesters and -benzylesters, in particular -alkyl esters having from 1 to 12 carbon atoms in the alcohol moiety, (meth)acrylic acid hydroxy alkyl ester having from 2 to 6 carbon atoms in the alkyl group, secondary and tertiary amino alkyl esters of (meth)acrylic acid having from 2 to 4 carbon atoms in the alkyl group, (meth)acrylic acid, (meth)acrylic acid amide, N-alkyl-(meth)acrylamide having from 1 to 8 carbon atoms in the alkyl group, N-dialkyl(meth)acryl amide having from 1 to 8 carbon atoms in the alkyl radical, 2-isocyanatoethyl-(meth)-acrylate, 2-methoxy ethyl (meth)acrylate, glycidyl (meth)acrylate, crotonic acid, crotonic acid amide, cinnamic acid; mono-$C_1C_{10}$-alkyl esters as well as monocyclohexyl- and dicyclohexyl esters, monobenzyl- and dibenzyl esters of $\alpha,\beta$-unsaturated dicarboxylic acids having from 3 to 5 carbon atoms, $\alpha,\beta$-unsaturated dicarboxylic acids themselves, their anhydrides, their mono- and diamides and cyclic imides; monoolefins having from 3 to 8 carbon atoms such as propene, isobutylene, and diisobutylene;

Vinylesters of aliphatic $C_1$-$C_{12}$-carboxylic acids; vinylchloride, vinylidenechloride, vinylfluoride, vinylisocyanate, isoprenylisocyanate, vinyloxazoline, vinyloxazolidone, N-vinylpyrolidone, diethoxyethylvinylsilane, diethoxymethylvinylsilane, trimethoxyvinylsilane, trimethylvinylsilane, allylacetate, isopropylenephenol; and Vinylalkylethers having from 1 to 8 carbon atoms in the alkyl group.

Preferred monomers of group C are: Aliphatic esters of (meth)acrylic acid having from 1 to 8 carbon atoms in the alcohol moiety, cyclohexylmethacrylate, (meth)acrylic acid, maleic acid, maleic acid anhydride, maleic acid semiesters or maleic acid diesters having from 1 to 8 carbon atoms in the alcohol moiety, N-methyl-maleic acid imide, N-cyclohexyl-maleic acid imide, fumaric acid semiesters and -diesters having from 1 to 8 carbon atoms in the alcohol moiety propylene, vinylacetate, and 2-vinyloxazoline.

The specified maleic and fumaric acids and their specified derivatives as well as acrylic acid, methacrylic acid, vinyl acetate, methyl methacrylate and propylene are particularly preferred.

The following polymers or copolymers from the following combinations of monomers are particularly preferred: Styrene-acrylonitrile, styrene-maleic acid anhydride, $\alpha$-methylstyrene-acrylonitrile, styrene-acrylonitrile-methacrylonitrile, styrene-$\alpha$-methylstyrene-acrylonitrile, $\alpha$-methylstyrene-acrylonitrile-methacrylonitrile, styrene-acrylamide-methylmethacrylate, styrene-methacrylamide-methylmethacrylate, styrene-methacrylic acid-methylmethacrylate, styrene-maleic acid anhydride-methylmethacrylate, styrene-maleic acid anhydride-vinylacetate, styrene-acrylonitrile-maleic acid anhydride, styrene-acrylonitrile-methacrylic acid, styrene-acrylonitrile-methylmethacrylate, styrene-acrylonitrile-tertiary-butylacrylate, styrene-methacrylonitrile-maleic acid anhydride, styrene-acrylonitrile-N-cyclohexymaleic imide, styrene-acrylonitrile-maleic acid semiester, styrene-acrylonitrile-fumaric acid semiester, styrene-acrylonitrile-maleic acid diester, styrene-acrylonitrile-fumaric acid diester, wherein the alcohol moiety of the semi- or diester is represented by aliphatic monohydric alcohols having from 1 to 8 carbon atoms or by cyclohexanol, styrene-acrylonitrile-methylvinylketone, styrene-acrylonitrile-butylmethacrylate, $\alpha$-methylstyrene-methacrylonitrile-methylmethacrylate, styrene-acrylonitrile-vinylacetate, styrene-acrylonitrile-methacrylate, styrene methacrylonitrile-butyl methacrylate, styrene-acrylonitrile-methacrylonitrile and a methacrylic acid- or acrylic acid alkyl ester having from 1 to 8 carbon atoms in the alcohol moiety, styrene-acrylonitrile-vinyl acetate-maleic acid anhydride, $\alpha$-methyl-styrene-acrylonitrile-maleic acid anhydride-styrene, styrene-cyclohexylmethacrylate, styrene-methylmethacrylate, cyclohexylmethacrylate-methylmethacrylate-maleic acid anhydride, styrene-methylmethacrylate-maleic acid anhydride, styrene-butylacrylate-acrylic acid, styrene-butyl methacrylate-methacrylic acid, methacrylonitrile-acrylonitrile-isobutylmethacrylate, methacrylonitrile-isobutylmethacrylate, methacrylonitrile-tertiary-butylmethacrylate, styrene-acrylonitrile-methacrylonitrile-vinylacetate, and styrene-methacrylonitrile-vinylacetate.

Polymerisation in the tank reactor, which is stage 1 of the process is carried out under stationary conditions with ideal mixing.

The term "under stationary conditions" used herein and throughout the specification means that the concentration of all reactants and the compositions of the products formed remain practically constant throughout the duration of polymerisation. In addition, the reaction parameters such as compositions of residual monomers, viscosities of the polymerisation compositions, temperatures, concentrations of initiators and conversions are approximately constant throughout polymerisation in time. The polymer formed and the residual monomers are removed from the reaction chambers at the same flow-rate as that at which the starting monomers are added. Stable stationary conditions are normally present in the polymerisation chamber of stage 1 of the process after about 0.5 to 24 hours, measured from the beginning of the operating period. During polymerisation under stationary conditions, differential and integral compositions of the polymers are the same, and the proportion of polymer composition in relation to the residual monomer composition being formed depends upon the conversion. The term differential composition as used herein and throughout the specification means the composition of that polymer which is formed at a particular moment and the term the integral composition as used herein and throughout the specification means the gross composition of that polymer which has been formed within a certain period.

The term "Ideal mixing" as used herein and throughout the specification means the mixing period is 1/10th of the average residence time or shorter. This condition must be satisfied in the first stage. In said stage, the average residence time may be 10 to 240 minutes, preferably 20 to 120 minutes and the mixing period is 5 to 120 seconds, preferably 5 to 30 seconds.

In order to carry out the process according to the present invention, it is necessary to select the concentrations of the monomers in the starting monomer mixtures in such a way that, with the desired conversion, polymers are formed in each case within the desired gross composition, for example from ABC. The associated starting monomer composition may be determined by experiments varying them with the given conversion until the polymer of the desired gross composition is formed within the limits of ABC. It is easier to calculate the monomer compositions which supply the desired copolymer at a given conversion from the copolymerisation parameters tabulated in the known literature, or from Q-e values (terms for resonance and polarisation) with the aid of the copolymerisation equation. Slight corrections may be made to the calculated monomer compositions by means of experiments in order to improve the accuracy and to obtain the exact desired gross polymer composition. In order to be able to determine the concentrations with corresponding conversions under stationary conditions, with the aid of the copolymerisation equation, it is necessary to carry out the following operations. The copolymer ABC is formed only if a specific residual monomer composition is present. It results, for example, from the copolymerisation parameters of the ternary mixture of styrene (S), acrylonitrile (AN) and maleic acid anhydride (MA) which is a residual monomer mixture of 65.44 mol of styrene, 33.98 mol % of acrylonitrile and 0.58 mol % of maleic acid anhydride wherein $r_{SAN}=0.37$, $r_{ANS}=0.07$, $r_{SMA}=10^{-2}$, $r_{MAS}=10^{-4}$, $r_{ANMA}=6.0$, $r_{MAAN}=10^{-4}$. Under stationary conditions (integral polymer composition is the same as the differential polymer composition) this corresponds to a polymer composed of 55.29 mol % of styrene, 29.69 mol % of acrylonitrile and 15.02 mol % of maleic acid anhydride (polymer composition ABC). Both concentrations are in equilibrium in the stationary condition.

In this example, 100 parts by weight of monomer mixture per unit time are used, polymerisation is carried out in stage 1 of the process to a conversion of 27% by weight and therefore 27 parts by weight of polymer having the above composition (ABC) are produced per unit time. 73 parts by weight of residual monomers of the above composition are subsequently removed per unit time from stage 1. It thus follows from the mass balance that 100 parts by weight of starting monomer mixture composed of 62.72 mol % of styrene, 32.83 mol % of acrylonitrile and 4.44 mol % of maleic anhydride have to be added per time unit to the blended tank reactor in stage 1 of the process.

The monomer reactivities are described with the aid of either Q-e-values or copolymerisation parameters (r-values), which are also known as "monomer reactivity ratios", (H. G. Elias, Makromoleküle, Hüthig u. Wepf-Verlag, Heidelberg 1972. These parameters (Q-e values or r values) are tabulated for almost all conventional monomers nowadays and are available for any skilled man (cf. Brandup u. E. H. Immergut, Polymer Handbook, Interscience Publishers, New York 1966). They may also be determined in known manner (cf H. G. Elias, Makromoleküle, Hüthig u. Wepf Verlag, Basel, 1971, Page 541). Polymerisation in the stirred tank reactor may be carried out at atmospheric pressure or at super-pressure. The tank reactor may be flooded or may be partially filled with a supernatant gaseous phase. The gaseous phase may be composed of either inert gas or a mixture of inert gas and monomer vapours. The heat of polymerisation may be removed by known processes, for instance, via the tank wall, by introduction of a cold monomer mixture or by a flow of product cooled by means of external heat exchangers as well as by evaporation cooling using processes known per se, If polymerisation is carried out at super-pressure, the flow of product will be determined by the monomer dosing pump. A tank reactor is a reaction vessel provided with inlet means, outlet means, a stirrer and an apparatus for removing the heat of reaction. It is distinguished from a normal tube reactor by the length to width ratio being from 1:1 to 6:1 in the case of the tank reactor. Intensively mixing stirring mechanisms may be used as the stirrer. Examples of such are, impeller stirrers, transverse beam stirrers, screw or loop stirrers, anchor stirrers, and propeller stirrers. To improve mixing polymer syrup may be continuously removed at the bottom of the reactor and reintroduced from the top in a cycle or vice versa. The tank reactor may also be provided with a reflux condenser for removing the reaction enthalpy by vapour cooling.

In special cases, two or three ideally stirred (mixed) tank reactors may be arranged in succession instead of a single ideally mixed tank reactor.

The initiator is introduced continuously together with the monomer mixture into the tank reactor. Stage 1 of the process is carried out at pressures of from 1 to 20 bar with backmixing, but preferably at atmospheric pressure with backmixing. The temperature of polymerisation are normally from 60° to 150° C. Chain breakers or transfer agents such as normal- or tertiary-dodecylmercaptan, thioglycol, thioglycerin, cyclohexene, allylalcohol, methylvinyl carbinol, and carbon tetrachloride may be used in amounts of from 0.1 to 2% by weight based on monomers for reducing the molecular weight. The reaction product is removed from the tank reactor in the same proportion as fresh starting mixture is introduced.

Inert additives such as flowing agents, stearates, waxes, white oils, and viscosity-reducing liquids such as ethyl benzene, toluene, benzene, and tertiary butanol in quantities of from 0.1 to 30% by weight based on total monomers, may also be used throughout the entire process for reducing the viscosities and, if necessary, be separated at the end by the evaporation process described. Stabilizers such as tertiary-butyl phenols and hydroquinone monomethyl ethers may also be added in quantities of from 10 to 1000 ppm to the monomers used.

The conversion may be regulated by known methods by selection of the initiator, the initiator concentration, the temperature used and also by the average residence time.

The density of the polymer syrup or the viscosity thereof may be used for checking the conversion in the stages of the process and may also be used as controlled variables in automatic control systems for maintaining certain conversions. When used in the first stage of the process, initiators should have a half-life at the polymerisation temperature which is 1/10 or less of the average residence time and is equal to or longer than the mixing period. If these conditions are not satisfied, inhomogeneous and incompatible products are obtained.

Initiators for stage one of the process, i.e. for polymerisation temperatures of from 60° to 150° C. include, for example, tertiary-butylperpivalate, benzoyl peroxide, p-chlorobenzoyl peroxide, tertiary butyl peroctoate, azo diisobutyric acid dinitrile, diisopropyl peroxy dicarbonate, diethylhexylperoxy dicarbonate, lauroylperoxide, and cyclohexyl sulphonyl peracetate.

The initiators are each used in amounts of from 0.01 to 0.5% by weight based on the monomers in stage 1 of the process.

The polymer syrup removed, which has a viscosity of from 1 to 1000 poise at 60° to 150° C. when measured in a rotational viscosimeter, is further processed immediately in stage 2 of the process. Before entering stage 2 (evaporation stage 1), i.e. evaporation in a spiral tube, polymerisation inhibitors such as, for example, hydroquinone-monomethylether or ditertiary-butyl-p-cresol, lubricants, and light and ageing stabilizers, may be added to the syrup leaving stage 1 of the process when in the form of a monomer solution in quantities of from 0.1 to 6.0% by weight based on said syrup. Before entering the stage of evaporation in the spiral tube, the syrup may be brought to higher pressures of up to 35 bar and temperature of up to 225° C. Spiral tube evaporators consist of spiral tubes which may be heated (cf. German Offenlegungsschrift No. 1,667,051). A reduced pressure of down to 0.1 bar may be applied at the end of the spiral tube evaporator. The evaporator may be heated in zones, in which case, temperatures of 60° to 225° C. are used. The temperatures are those of the wall of the evaporator. In order to assist the evaporation effect, a blowing gas, in particular nitrogen or steam, may be blown into the evaporator. The quantity of blowing gas used is from 10 to 1000% by volume based on monomers blown out. The polymer concentrate leaves the outlet of the evaporator with a solid content of from 70 to 90 mol % and their viscosities are in the range of 1 to 10000 poises at 225° C.

The polymer concentrate is introduced directly into the inlet zone of a screw evaporator, which is divided into an inlet zone and at least 2 evaporation zones (stage 3 of the process), preferably into a self-cleaning screw evaporator. Subsequent evaporation takes place in at least two zones at different pressures (evaporation stages 2 and 3), the zone nearer the outlet being at the lower pressure of the two.

Temperatures of 100° to 250° C. and pressures of 0.01 to 0.3 bar prevail in the first zone of the screw (evaporation stage 2). Temperatures of 150° to 250° C. and pressures of 0.001 to 0.2 bar are employed in the zone at the lower pressure (evaporator stage 3). In the second evaporator stage, the polymer is brought to a solid polymer content of 80 to 98 mol % and in the third evaporator stage to a solid polymer content in excess of 99.9 mol %. The individual stages may again be divided into subzones in which the specified conditions are to be used. The resin leaves the screw evaporator in the form of a melt which is drawn, for example, into a strand, set in water and then cut into a granulate or is squeezed on rollers and set.

An essential feature of the present invention is that not all monomers are recycled to the process, but only certain fractions obtained from the combination of stages 2 and 3 of the process in conjunction with the polymerisation stage (stage 1 of the process) are recycled. The monomers expelled from the last zone of stage 2 of the process (preferably evaporator stage 3), 10 to 2.0 mol % based on polymer, are no longer recycled into the process. Preferably they are burnt.

In a preferred embodiment, an inert gas is used in the evaporator stage 1 for evaporation in the spiral tube to aid the expulsion of monomers. This inert gas is circulated and partially liberated and fractionated from the gaseous residual monomers, so that an equilibrium residual monomer concentration is formed in due course. Separation is effected by condensation on cooled surfaces so that the surface temperature is based on the pressure and the vapour pressure curve of the corresponding monomers.

The inert gas stream must be brought below the dew point of the monomers used, and the temperatures to be selected may be determined by the skilled man by reference to vapour pressure curves and saturation curves. The temperatures are generally from −30° to +80° C. at pressures of 1 to 0.1 bar.

Condensation is carried out in two zones at different temperatures wherein the second zone is kept at 5° to 100° C. lower than the first zone. 50 to 99.5% by volume based on evaporated monomers are condensed in the first zone and 0.5 to 50% by volume of monomers based on evaporated monomers are condensed in the second zone of the evaporating stage 1.

The monomers frozen out in the second zone of the evaporating stage 3 are not recycled into the process. The monomers from the first condensation zone of the evaporating stage 1 and the condensed monomers from evaporating stage 2 are combined and recycled to the process, taking into consideration the individual concentrations of monomers ABC, and are introduced into the tank reactor together with new starting monomers ABC for polymerisation.

A total of 86 to 98,95 mol-% of the evaporated monomers are recovered.

The combination of a tank reactor with multiple stage evaporation on a spiral tube evaporator and an evaporation screw in conjunction with the preceding conversions and concentration stages guarantees that the impurities accumulating are sluiced out of the process without additional outlay and further guarantees that polymers may be produced industrially without failures for prolonged stable operating periods. It also provides a very pure product of the type required particularly in the field of food packaging.

The process of the present invention has the advantage over known combinations of processing stages of high economic viability and it produces polymers of high chemical and molecular uniformity. The molecular uniformity is in the range of from 0.6 to 2.0 wherein the equation:

$$U = (Mw/Mn) - 1$$

in which U=lack of uniformity, Mn=numerical average, Mw=average weight of the molecular weight, is used for determining the lack of molecular uniformity. This, in turn, results in an optimum relationship between high molecular weight and low melt viscosity and thus good processibility. Another advantage of the present invention is that monomers of different reactivity such as, for example, maleic acid anhydride may be polymerised with styrene or with methacrylates to form chemically uniform polymers. Polymer mixtures, apart from their azeotropic composition, may also be polymerised by this process to form chemically uniform thermoplastic moulding materials in relatively cheap reaction units. The uniformities which may be obtained by the process can only rarely be obtained under non-stationary conditions in high viscosity reactors. The process of the present invention does not require polymerisation in a high viscosity stage for economical utilization of the screw evaporator, and also obviates expensive purification of monomers by fractional distillation. It also allows the process to be carried out for a long duration without an accumulation of undesirable impurities.

The resins produced by the process according to the present invention are used as thermoplastic moulding materials for injection moulding, deep-drawing and press-cured articles such as kitchen utensils, fittings, household utensils, interior fittings in the car industry, in the boat industry, in optics and in electronics. They are distinguished partly by their stability in boiling water. Moreover, they may be processed excellently on injection moulding machines owing to their good melt flow properties. The materials are also suitable for the production of films and containers for packing groceries owing to their nitrile content, their impermeability to gas and resistance to smell. They are also suitable for the production of optical lens materials owing to their high light transmitting capacity.

The copolymers obtained according to the present invention have average molecular weights of $10^4$ to $10^6$, preferably $5.10^4$ to $5.10^5$, calculated from the intrinsic viscosities of 0.1 to 2 dl/g, preferably 0.4 to 1.2 dl/g which have been determined in dimethyl formamide at 25° C.

EXAMPLES

The polymerisation apparatus consists of a 25 l tank reactor 1 with an anchor stirrer 2 and flow breaker, a dosing unit 3 for dosing monomers I and initiators II, a spiral tube evaporator 4 having a length of 8 m and an internal tube diameter of 16 mm, a 32 mm two-shaft, self-cleaning evaporation screw 5 with three evaporation zones which may be evacuated to various pressures by means of vacuum pumps. A nozzle with a water bath 6 behind it and a granulation apparatus 23 are located at the screw outlet.

The monomers or monomer mixtures specified in the following tables are continuously mixed with the initiators and brought to the prescribed temperature by means of a heat exchanger 7. The flow is introduced into the tank reactor from above, and the syrup is removed at the bottom by means of an outlet pump 8 in such a way that the reactor remains filled to about two thirds of its volume in the operating conditions with polymer syrup. The casing of the reactor 9 is heated with oil which is tempered by means of a heating/cooling system 10. The pump which delivers the syrup conveys it to the spiral tube evaporator (evaporating stage 1). A stream of nitrogen III may be sluiced into the inlet position 11 at the same time. The outlet of the spiral tube evaporator 12 opens directly onto the inlet zone 13 of the screw evaporator. This inlet zone 13 is kept at a reduced pressure by means of a water ring pump 18, the escaping vapours and the blowing gas being passed via a condenser 14 composed of a bank of tubes which is cooled by water at 10° to 20° C. (10° to 20° C. condensate) and are subsequently passed via a condenser 15 composed of a bank of tubes and cooled by brine to −30° C. (−30° C. condensate). The condensate is collected separately. The first and second evaporation zones 16 and 17 respectively, of the screw evaporator 5 (evaporating stage 2 and 3) are evacuated by means of rotary vane oil pumps 19 and 22 and the monomer vapour produced is condensed with brine at −30° C. by means of condensers 20 and 21 composed of banks of tubes. The condensates are also collected separately. The resin produced is chilled in a water bath and is cut by means of an extrusion and granulating apparatus 23 to form a cylindrical granulate.

The condensates produced in the condenser in the form of banks of tubes 14 kept at 10° to 20° C. in the evaporating stage 1 and from the first zone of the screw evaporator in evaporating stage 2 16 are combined. The composition thereof is determined by gas chromatography every 8 hours and the starting monomer composition is adjusted by addition of fresh monomers. These recovered monomers IV together with fresh starting monomers I are reintroduced proportionately into the tank reactor 2 in such a way that the charge is consumed after 8 hours and the next 8 hour residual monomer charge may be used. The condensate V from the colder −30° C. condensation zone of the evaporating stage 1 15 and the condensate VI from the last zone of the screw 17 of the evaporating stage 3 are sluiced out of the process and burnt. The blowing gas III, that is, nitrogen from the evaporating stage 1, is compressed downstream of the water ring pump 18 and is introduced into a buffer container from which the blowing gas III is removed for the spiral tube evaporator 4.

All parameters of the process and all concentrations and compositions are shown in tabular form in the following Examples. The experiments were each conducted for 144 hours without variations in the properties of the product.

EXAMPLE 1

| | |
|---|---|
| Polymerisation | |
| Starting monomer | Styrene |
| Inhibitor, % by weight based on monomer | 0.1 di-tertiary-butyl-p-cresol |
| Styrene dosing, kg/h | 40 |
| Inlet temperature of the monomer into the reactor, °C. | 22 |
| Initiator, % by weight based on monomer | 0.14 tertiary-butyl-perpivalate |
| Internal temperature of tank reactor, °C. | 132 |
| Pressure, mm Hg | 758 |
| Wall temperature of tank reactor oil °C. | 120 |
| Average residence time in tank reactor (min) | 15 |
| Stationary conversion in tank reactor, % by weight | 36 |
| Evaporating stage 1 | |
| Syrup pressure before entry into the spiral tube evaporator, bar | 19 |
| Syrup temperature, °C. (syrup = polymer + residual monomer) | 167 |
| Wall temperature of the spiral tube evaporator, °C. | 220 |
| Pressure at outlet of spiral tube evaporator in millibar | 47 |
| Syrup concentration at outlet of spiral tube evaporator, mol % | 80 |
| Temperature of inlet zone of screw evaporator, °C. | 224 |
| Evaporator stage 2 | |
| Temperature of first zone of screw evaporator, °C. | 228 |
| Pressure, millibar | 3 |
| Evaporating stage 3 | |
| Temperature of second and last zone of screw evaporator, °C. | 227 |
| Pressure of second zone of screw evaporator, millibar | 0.7 |
| Polymer concentration in product outlet after screw evaporator, mol % | 99.05 |
| Quantities of condensate, kg/h | |
| Evaporating stage 1 20° C. condensate (spiral tube evaporator) | 16.8 |
| −30° C. condensate, kg/h | 0.8 |
| Evaporating stage 2, kg/h (= 1st zone of screw evaporator) | 7.75 |
| Evaporating stage 3, kg/h (= 2nd zone of screw evaporator) | 0.25 |
| Quantity of condensate from evaporating stage 1 20° C. condensate and evaporating stage 2, kg/8h | 196.4 |
| Mol % of condensate of the monomer, based on residual monomer | 95.8 |
| Composition of condensate, % by weight (mol %) | 100 (100) Styrene |
| Composition of polymer, % by weight (mol %) | 100 (100) Styrene units |
| Yield of polymer, kg/h | 14.4 |
| Intrinsic viscosity, 25° C. in DMF, dl/g | 0.44 |
| DMF = dimethylformamide | |
| Heat moulding stability according to Vicat, DIN 53 460, °C. Method B | 95 |
| Lack of molecular uniformity, U | 1.3 |

EXAMPLE 2

| | |
|---|---|
| Polymerisation | |
| Starting monomer mixture | |
| % by weight | 65 Styrene, 35 Acrylonitrile |
| Mol % | 48.6 Styrene, 51.34 Acrylonitrile |
| Inhibitor, % by weight based on monomer mixture | 0.1 di-tertiary-butyl-p-cresol |
| Monomer dosing, kg/h | 40 |
| Inlet temperature of monomers in the reactor, °C. | 20 |
| Initiator, % by weight based on monomers | 0.850 di-isopropylpercarbonate, 25% in test benzine, boiling point about 160°-180° C. |
| Internal temperature of tank reactor, °C. | 92 |
| Pressure, mm Hg | 850 |
| Temperature of oil at casing of tank reactor, °C. | 40 |
| Average residence time in tank reactor, min | 18 |
| Stationary conversion in tank reactor (% by weight) | 38 |
| Stationary conversion in tank reactor (mol %) | 36.5 |
| Evaporating stage 1 | |
| Syrup pressure of inlet into spiral tube evaporator, bar | 2.2 |
| Syrup temperature, °C. (syrup = polymer + residual monomers) | 42 |
| Quantity of blowing gas, nitrogen % by volume, based on residual monomers blown out (spiral tube evaporator) | 344 |
| Blowing gas pressure, bar | 2.2 |
| Liter/hour of blowing gases | 3300 |
| Wall temperature of spiral tube evaporator, °C. | 101 |
| Pressure at outlet of spiral tube evaporator in millibar | 600 |
| Syrup concentration at outlet of spiral tube evaporator, mol % | 55 |
| Temperature of the inlet zone of the screw evaporator, °C. | 52 |
| Evaporating stage 2 | |
| Temperature of first zone of screw evaporator, °C. | 220 |
| Pressure, millibar | 170 |
| Evaporating stage 3 | |
| Temperature of second zone of screw evaporator, °C. | 228 |
| Pressure of second zone of screw evaporator, millibar | 8 |
| Polymer concentration in product outlet after screw evaporator, mol % | 99.97 |
| Quantities of condensate | |
| Evaporating stage 1 | |
| 10 C. condensate, kg/h (spiral tube evaporator) | 6.0 |
| −30° condensate, kg/h | 0.4 |
| Evaporating stage 2, kg/h (= first zone of screw evaporator) | 16.4 |
| Evaporating stage 3, kg/h (= second zone of screw evaporator) | 2.0 |
| Quantity of condensate from stage 1 of evaporator, 20° C. condensate and second stage of evaporator, kg/8 h | 179.2 |
| Mol % of condensate of the monomers, based on evaporated monomers | 90.3 |
| Composition of condensate % by weight (mol %) | 61.8 (45.2) Styrene 38.2 (54.7) Acrylonitrile units |
| Polymer yield, kg/h | 15.2 |
| Intrinsic viscosity 25° C. in DMF, dl/g | 0.86 |
| Thermal moulding stability according to Vicat, DIN 53 460, °C. | |
| Method B | 105 |
| Lack of molecular uniformity, U | 1.2 |

EXAMPLE 3

| Polymerisation | |
|---|---|
| Starting monomer mixture | 60 Styrene, 10 α-methylstyrene, 26 Acrylonitrile, |
| % by weight | 4 Maleic acid anhydride |
| (Mol %) | (48.65 Styrene, 6.58 α-methylstyrene, 41.3 Acrylonitrile, 3.4 Maleic acid anhydride) |
| Inhibitor, % by weight, based on monomer mixture | 0.1 di-tertiary-butyl-p-cresol |
| Monomer dosing, kg/h | 40 |
| Inlet temperature of the monomers in the reactor, °C. | 20 |
| Initiator, % by weight, based on monomers | 0.80 di-isopropylpercarbonate, 25% in test benzine boiling point about 160°–180° |
| Internal temperature of tank reactor, °C. | 92 |
| Pressure, mm Hg | 760 |
| Temperature of oil at wall of tank reactor, °C. | 40 |
| Average residence time in tank reactor (min) | 18 |
| Stationary conversion in tank reactor (% by weight) | 38 |
| Stationary conversion in tank reactor (mol %) | 37.1 |
| Evaporating stage 1 | |
| Syrup pressure from inlet in the spiral tube evaporator, bar | 2.2 |
| Syrup temperature, °C. | 42 |
| Quantity of blowing gas, nitrogen, % by volume based on residual monomers blown in (spiral tube evaporator) | 136 |
| Blowing gas pressure, bar | 2.2 |
| Liter/h of blowing as | 3300 |
| Wall temperature of spiral tube evaporator, °C. | 110 |
| Pressure at outlet of spiral tube evaporator in millibar | 405 |
| Syrup concentration at outlet of spiral tube evaporator (mol %) | 60 |
| Temperature of inlet zone of screw evaporator, °C. | 52 |
| Evaporating Stage 2 | |
| Temperature in first zone of screw evaporator, °C. | 220 |
| Pressure, Millibar | 170 |
| Evaporating Stage 3 | |
| Temperature of second zone of screw evaporator, °C. | 228 |
| Pressure of 2 zones of screw evaporator, Millibar | 7.5 |
| Polymer concentration in product outlet after screw evaporator (Mol %) | 99.97 |
| Quantities of Condensate | |
| Evaporating stage 1 10° C. condensate, kg/h (spiral tube evaporator) | 8.6 |
| −30° C. condensate, kg/h | 0.6 |
| Evaporating stage 2, kg/h (= first zone of screw evaporator) | 5.4 |
| Evaporating Stage 3, kg/h (= second zone of screw evaporator) | 0.2 |
| Quantity of condensate from evaporating stage 1 20° C. condensate and evaporating stage 2, kg/8 h | 192 |
| Mol %, condensate of monomers, based on residual monomers | 97.3 |
| Composition of condensate % by weight (mol %) | 58 (46.3) styrene 12.1 (8.6) α-methylstyrene |

|  | -continued |
|---|---|
| Composition of polymer<br>% by weight (Mol %) | 28.9 (45.1) acrylonitrile<br>63.7 (51.5) styrene units<br>5.0 (3.4)α-methylstyrene units<br>21.6 (35.2) acrylonitrile units<br>9.5 (8.2) maleic acid anhydride units |
| Yield of polymer, kg/h | 14.4 |
| Intrinsic viscosity, 25° C.<br>in DMF, dl/g | 0.45 |
| Thermal molding stability<br>according to Vicat, DIN 53 450,<br>°C.<br>Method B | 126 |
| Lack of molecular uniformity, U | 0.9 |

EXAMPLE 4

| Polymerisation | |
|---|---|
| Starting monomer mixture,<br>% by weight (Mol %) | 47.5 (35.0) cyclohexylmethacrylate<br>50 (61.8) methylmethacrylate<br>2.5 (32) maleic acid anhydride |
| Inhibitor, % by weight based<br>on monomer mixture | 0.1 di-tertiary-butyl-p-cresol |
| Monomer dosing kg/h | 40 |
| Inlet temperature of monomers in reactor °C. | 60 |
| Initiator, % by weight, based on monomers | 0.035 tertiary perpivalate |
| Internal temperature of tank reactor, °C. | 140 |
| Pressure, mm Hg | 752 |
| Temperature of oil on wall of tank reactor, °C. | 140 |
| Average residence time in tank reactor, Min. | 20 |
| Stationary conversion in tank reactor, % by weight | 38 |
| Stationary conversion in tank reactor, Mol % | 40 |
| Evaporating Stage 1 | |
| Syrup pressure from inlet in spiral tube evaporator, bar | 2.2 |
| Syrup temperature, °C. | 140 |
| Quantity of blowing gas, nitrogen, % by volume, based on residual monomers blown out (spiral tube evaporator) | 167 |
| Blowing gas pressure, bar | 2.2 |
| Liter/h of blowing gas | 3000 |
| Wall temperature of spiral tube evaporator, °C. | 140 |
| Pressure at outlet of spiral tube evaporator in Millibar | 500 |
| Syrup concentration at outlet of spiral tube evaporator (Mol %) | 65 |
| Temperature of inlet zone of screw evaporator, °C. | 140 |
| Evaporating stage 2 | |
| Temperature of first zone of screw evaporator, °C. | 222 |
| Pressure Millibar | 160 |
| Evaporating stage 3 | |
| Temperature of second zone of screw evaporator, °C. | 230 |
| Pressure of second zone of screw evaporator Millibar | 7 |
| Concentration of polymer in product outlet after screw evaporator, mol % | 99.97 |
| Evaporating stage 1 | |
| 20° C. condensate, kg/h | 13.5 |
| −30° C. Condensate, kg/h | 0.5 |
| Evaporating stage 2, kg/h<br>(= first zone of screw evaporator) | 10.6 |
| Evaporating stage 3, kg/h<br>(= second zone of screw evaporator) | 0.7 |
| Quantity of condensate from evaporating stage 1, 20° C. condensate and evaporating stage 2,<br>kg/8h | 192.8 |

-continued

| | |
|---|---|
| Mol % condensate of monomers, based on residual monomers | 96 |
| Composition of condensate | 55 (42.2) cyclohexyl-methacrylate |
| (% by weight) (mol %) | 45 (57.8) methylmethacrylate |
| Composition of polymer | 36.6 (25.6) cyclohexylmethacrylate units |
| % by weight (Mol %) | 59.7 (70) methylmethacrylate units |
| | 3.6 (4.4) maleic acid anhydride units |
| Yield of Polymer, kg/h | 15.2 |
| Intrinsic viscosity, 25° C. in DMF, dl/g | 0.67 |
| Thermal molding stability according to Vicat, DIN 53 460, °C. | 112 |
| Lack of molecular uniformity, O | 1.1 |

EXAMPLE 5

| | |
|---|---|
| Polymerisation | |
| Starting monomer mixture, | 53 (53.3) styrene |
| | 34 (27.8) butylacrylate |
| % by weight, (Mol .) | 13 (18.8) acrylic acid |
| Inhibitor, % by weight based on monomer mixture | 0.1 di-tertiary-butyl-p-kresol |
| Monomer dosing kg/h | 40 |
| Inlet temperature of monomers in the reactor, °C. | 18 |
| Initiator, % by weight based on monomers | 0.11 tertiary-butylperpivalate |
| internal temperature of tank reactor, °C. | 128 |
| Pressure, mm Hg | 762 |
| Wall temperature of tank reactor oil, °C. | 128 |
| Average residence time in tank reactor, Min. | 20 |
| Stationary conversion in tank reactor, % by weight | 38 |
| Stationary conversion in tank reactor, Mol % | 38.6 |
| Evaporating Stage 1 | |
| Syrup pressure before inlet into spiral tube evaporator, bar | 6 |
| Syrup temperature, °C. | 167 |
| Ball temperature of spiral tube evaporator, °C. | 220 |
| Pressure at outlet of spiral tube evaporator, millibar | 142 |
| Temperature of inlet zone of screw evaporator, °C. | 224 |
| Syrup concentration at outlet of spiral tube evaporator, Mol % | 80 |
| Evaporating stage 2 | |
| Temperature of first zone of screw evaporator, °C. | 227 |
| Pressure, Millibar | 197 |
| Evaporating stage 3 | |
| Temperature of second zone of screw evaporator, °C. | 227 |
| Pressure of second zones of screw evaporator, Millibar | 210 |
| concentration of polymer in product outlet after screw evaporator, Mol % | 99.97 |
| Quantities of condensate | |
| Evaporating stage 1 | |
| 20° C. condensate, kg/l | 16.5 |
| −30° C. condensate, kg/h | 0.2 |
| Evaporating stage 2, kg/h (= first zone of screw evaporator) | 7.97 |
| Evaporating stage 3, kg/h (= second zone of screw evaporator) | 0.13 |
| Quantity of condensate from evaporating stage 1, 20° C. condensate and evaporating stage 2, kg/8h | 195.8 |

-continued

| | |
|---|---|
| Mol % condensate of monomers, based on residual monomers | 99 |
| Composition of condensate, % by weight (mol %) | 49.8 (50.6) styrene<br>37.8 (31.2) butylacrylate<br>12.4 (18.2) acrylic acid |
| Composition of polymer % by weight, (Mol %) | 58.2 (57.6) styrene units<br>27.8 (22.4) butylacrylate units<br>13.9 (20.0) acrylic acid units |
| Yield of Polymer kg/h | 15.2 |
| Intrinsic viscosity, 25° C. in DMF, dl/g | 0.4 |
| Thermal molding stability according to Vicat, DIN 53 460, °C.<br>Method B | 65 |
| Lack of molecular uniformity, U | 1.1 |

EXAMPLE 6

| | |
|---|---|
| Polymerisation | |
| Starting monomer mixture, % by weight, (Mol %) | 25.0 (36.3) acrylonitrile<br>35.0 (40.3) methacrylonitrile<br>40.0 (23.4) isobutylmethacrylate |
| Inhibitor, % by weight based on monomer mixture | 0.1 di-tertiary-butyl-p-kresol |
| Monomer dosing, kg/h | 40 |
| Inlet temperature of monomers in to reactor, °C. | 20 |
| Initiator, % by weight based on Monomers | 0.085 tertiary-butylperivalate |
| Internal temperature of tank reactor, °C. | 92 |
| Pressure, mm Hg | 751 |
| Temperature of oil on tank reactor wall, °C. | 60 |
| Average residence time in tank reactor, Min. | 20 |
| Stationary conversion in tank reactor, % by weight | 38 |
| Stationary conversion in tank reactor, mol % | 40.6 |
| Evaporating Stage 1 | |
| Syrup pressure of inlet into spiral tube evaporator, bar | 2.2 |
| Syrup temperature, °C. | 90 |
| Quantity of blowing gas, nitrogen, % by volume based on residual monomers blown out, spiral tube evaporator | 114 |
| Blowing gas pressure | 2.2 |
| Liter/h of blowing gas | 3000 |
| Wall temperature of spiral tube evaporator, °C. | 110 |
| Pressure at outlet of spiral tube evaporator, Millibar | 400 |
| Concentration of syrup at outlet of spiral tube evaporator, Mol % | 70 |
| Temperature of inlet zone of screw evaporator, °C. | 100 |
| Evaporating stage 2 | |
| Temperature of first zone of screw evaporator, °C. | 220 |
| Pressure, Millibar | 110 |
| Evaporating stage 3 | |
| Temperature of second zone of screw evaporator, °C. | 228 |
| Pressure of 2 zones of screw evaporator, Millibar | 6.0 |
| Concentration of polymer in product outlet after screw evaporator, Mol % | 99.98 |
| Quantities of condensate | |
| Evaporating stage 1 | |
| 10° C. condensate kg/h | 9.0 |
| −30° C. condensate, kg/h | 0.6 |
| Evaporating stage 2, kg/h (= first zone of screw evaporator) | 14.9 |
| Evaporating stage 3, kg/h | |

| | |
|---|---|
| (= second zone of screw evaporator) | 0.3 |
| Quantity of condensate from evaporating stage 1, 20° C., condensate and evaporating stage 2, kg/8 h | 191.2 |
| Mol %, condensate of monomers based on residual monomers | 97 |
| Composition of condensate | 30.4 (42.9) acrylonitrile |
| % by weight (Mol %) | 32.1 (35.9) methacrylonitrile |
| | 37.4 (21.1) isobutylmethacrylate |
| Composition of polymer, | 16.1 (24.7) acrylonitrile units |
| % by weight (mol %) | 39.6 (48.0 methacrylonitrile units |
| | 15.2 |
| Composition of polymer, | |
| % by weight (mol %) | 44.3 (27.3) isobutylmethacrylate units |
| Yield of polymer, kg/h | 15.2 |
| Intrinsic viscosity, 25° C. in DMF dl/g | 0.71 |
| Thermal molding stability according to Vicat, DIN 53 460, °C. Method B | 89 |
| Lack of molecular uniformity, U | 1.3 |

We claim:

1. A process for the production of thermoplastically processible moulding materials based on vinyl polymers of high chemical and molecular uniformity and having residual monomer contents of less than 0.1 mol % which comprises the steps of:
   (i) mass homogeneous phase polymerization of at least one vinyl monomer in a stirred continously charged tank reactor to a conversion of from 25 to 60 mol %;
   (ii) directly concentrating the syrup consisting of residual monomers and vinyl polymer dissolved therein obtained from step (i) in a spiral tube evaporator at a temperature of from 60° to 250° C. and at a pressure of 100 m bar to 35 bar to obtain a solid content of vinyl polymer of from 40 to 90 mol %;
   (iii) directly charging the concentrate obtained from step (ii) to the inlet zone of a screw evaporator which consists of at least two sequential zones in order to effect further concentration, in which a first zone at a pressure of from 10 to 300 m bar and at a temperature of from 100° to 250° C. concentrates the vinyl polymer to a solid content of from 80 to 99 mol %, and each subsequent zone at a pressure of 1 to 200 m bar and at a temperature of 150° to 250° C. concentrates the vinyl polymer to a solid content of at least 99.9%; and
   (iv) recycling the residual monomers from step (ii) and the residual monomers from said first zone of the screw evaporator to the stirred and charged tank reactor without intermediate cleaning.

2. A process as claimed in claim 1 wherein residual monomers in the spiral tube evaporator are expelled with the aid of a stream of inert gas which is present in an amount of from 10 to 1000 parts by volume to 100 parts by volume of the residual monomers expelled, the inert gas streams charged with said residual monomers being freed thereof in two sequential zones in the screw evaporator, which zones differ in temperature by at least 10° C., and wherein from 50 to 99.5% by volume of the residual monomers are condensed in the zone at the higher temperature and from 0.5 to 50% by volume of the residual monomers are condensed in the zone of the lower temperature and the condensed monomers from the higher temperature condensation zone being combined with the residual monomers from the first zone of the screw evaporator and recycled to the tank reactor.

3. A process as claimed in claim 1 wherein the vinyl monomer is styrene, α-methylstyrene, acrylonitrile, methacrylonitrile, methylmethacrylate, acrylic acid or methacrylic acid ester, having from 2 to 8 carbon atoms in the ester fraction, cyclohexyl methacrylate, acrylic acid, methacrylic acid, acrylamide, maleic acid anhydride, maleic acid imide, m-cyclohexyl-maleic imide, or N-alkyl maleic acid imide having from 1 to 8 carbon atoms in the alkyl group or mixtures thereof.

* * * * *